(12) United States Patent
Smith

(10) Patent No.: US 9,188,147 B2
(45) Date of Patent: *Nov. 17, 2015

(54) STRUCTURE FOR REDUCING LOCKING DISTANCE IN RATCHETING DEVICES

(71) Applicant: Ronald A. Smith, Los Gatos, CA (US)

(72) Inventor: Ronald A. Smith, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/987,685

(22) Filed: Aug. 21, 2013

(65) Prior Publication Data

US 2015/0050100 A1    Feb. 19, 2015

Related U.S. Application Data

(63) Continuation-in-part of application No. 12/309,574, filed on Jan. 23, 2009, now Pat. No. 8,534,974.

(51) Int. Cl.
| | |
|---|---|
| *F16B 39/36* | (2006.01) |
| *F16B 33/02* | (2006.01) |
| *F16B 37/08* | (2006.01) |
| *F16B 39/32* | (2006.01) |

(52) U.S. Cl.
CPC ............. *F16B 33/02* (2013.01); *F16B 37/0857* (2013.01); *F16B 39/32* (2013.01)

(58) Field of Classification Search
CPC ............. F16B 37/0857; F16B 37/0864; F16B 37/0892
USPC .................. 411/261, 262, 265, 266, 267, 268
See application file for complete search history.

(56) References Cited

U.S. PATENT DOCUMENTS

| | | | | |
|---|---|---|---|---|
| 4,974,888 | A * | 12/1990 | Childers ........................ | 292/251 |
| 6,712,574 | B1 * | 3/2004 | Roopnarine ................... | 411/433 |
| 8,257,004 | B2 * | 9/2012 | Smith ............................ | 411/265 |
| 8,534,974 | B2 * | 9/2013 | Smith ............................ | 411/261 |
| 8,646,339 | B2 * | 2/2014 | Smith ..................... | 73/862.338 |
| 2011/0182697 | A1 * | 7/2011 | Smith ............................ | 411/433 |

* cited by examiner

*Primary Examiner* — Roberta Delisle
(74) *Attorney, Agent, or Firm* — George Wolken, Jr.

(57) ABSTRACT

The present invention relates to ratcheting thread clamping devices and the use of multiple interleaved thread structures on one or more of the segments of the ratcheting device. It is shown how the use of such multiple threads reduces locking distance when the ratcheting device is moved in the ratcheting direction along a single-threaded rod, that is, reduced locking distance is achieved with an improved thread clamping device without the necessity of any changes to the threaded rod to which the device clamps. Multiple thread structures thus reduce locking distance in prior art devices typically having frustoconical segment surfaces as well as in more recent devices having nut segments with planar surfaces.

8 Claims, 5 Drawing Sheets

STRUCTURE FOR REDUCING LOCKING DISTANCE IN RATCHETING DEVICES

CROSS-REFERENCE TO RELATED APPLICATIONS

This application is a continuation-in-part of our application Ser. No. 12/309,574 (filed 23 Jan. 2009, to be issued as U.S. Pat. No. 8,534,974 on Sep. 17, 2013), deriving from PCT application serial number PCT/US2007/016862 (International filing date 27 Jul. 2007) and provisional patent application 60/833,961 (filed 29 Jul. 2006) and claims priority therefrom pursuant to one or more of 35 U.S.C. §119, §120 and §365. The entire contents of the aforesaid patent applications are incorporated herein by reference for all purposes.

BACKGROUND OF THE INVENTION

1. Field of Invention

This invention relates generally to the field of ratcheting fastening devices and methods of use, more particularly, to shortening the locking distance of ratcheting fasteners by using double or multiple threads on one or more movable nut segments of the fastening device.

2. Description of Prior Art

A ratcheting fastener is a device that fastens to the external, threaded surface of a threaded rod. Such a device is capable of moving along the threaded rod in one direction, the "ratcheting direction" without rotation, but must be rotated in order to move along the threaded rod in the opposite "non-ratcheting" direction. Such devices are also called "ratcheting thread clamping devices" or simply "thread clamping devices" TCDs, which will be the designation used herein.

TCDs typically include a plurality of segments in a configuration so as to encompass some or all of the outer circumference of a threaded rod. The inner surfaces of some or all of the segments are threaded so as to engage with the threads of the threaded rod. The segments, or nut segments, are in a movable configuration ("movable nut segments") so as to allow disengagement of the TCD with the threads of the rod when moved in the ratcheting direction, but do not disengage and must be rotated in the manner of a conventional nut in order to move in the opposite non-ratcheting direction.

Numerous examples of TCDs exist including the following: U.S. Pat. Nos. 5,081,811; 6,007,284; 3,695,139; 4,378,187; 4,974,888; 5,324,150; 5,427,488; 5,733,084; 5,988,965; 6,361,260; 6,406,240. While conventional TCDs use segments having frustoconical segments, recent work by the present inventor describes TCDs having segments with flat, not frustoconical, surfaces. These include embodiments described in U.S. Pat. No. 8,257,004 and pending U.S. patent application Ser. No. 13/385,135 (Patent Application Publication US 2012/0134764 A1, "'764"). The entire contents of these references are included herein by reference for all purposes.

For motion in the ratcheting direction, the one or more threaded segments engaging with the threads of the threaded rod disengage from one thread of the rod, slide over the thread to re-engage with the adjacent thread of the rod. The distance moved by the TCD in disengaging with one thread and engaging with the next thread is the "locking distance."

In conventional TCDs, the threaded segments engaging the threads of the threaded rod have the same pitch as the threads on the rod. Thus, the locking distance is substantially the same as the thread pitch of the threaded rod.

However, there are important applications for TCDs, particularly in the construction industry, in which reducing the locking distance for a TCD engaging a threaded rod offers significant advantages.

For example, wood is a major construction material in many places throughout the world. Wooden structures frequently use "tie-downs" to secure the wooden structure to its foundation, typically a concrete foundation or a concrete and block foundation. The function of tie-downs is thus to secure the wooden structure to its foundation in the presence of forces (perhaps substantial forces) tending to separate the structure from its foundation, such as high winds, floods, seismic events, or general shifting and settling of the surrounding earth. However, the wood typically used for construction often has considerable water content when initially installed and with time, the water evaporates and the wood dries out. In the process of drying out, the wood dimensionally shrinks. Approximately 4% shrinkage in the first year following construction of a wooden structure is not uncommon. This shrinkage commonly causes tie-downs to loosen, thereby making the structure more susceptible to damaging displacements in the presence of high winds, earthquakes among other external forces. Catastrophic damage may result.

A common method for implementing a tie-down is by imbedding a vertical threaded rod into the concrete of the foundation at the location where the wooden structure is to be joined to the foundation. The threaded rod generally resides within the walls of a single or multilevel structure as it passes from the concrete foundation up through each floor of the structure. Each floor is typically attached to the threaded rod by a separate tie-down. The primary fastener presently used to implement a tie-down is a standard "hex" nut.

If a standard nut is used, a space will typically develop under the standard nut and above the wood as the wood shrinks in dimension due to loss of water as described above. This space allows the tie-down (and structure) to move vertically when an overturning moment is applied to the structure as might occur, for example, during a seismic event, wind loading, among other circumstances. This motion of the structure with respect to the foundation, in turn, allows for deformation of the structural walls and may produce substantial damage that the tie-down is designed to prevent when functioning properly, that is when holding the structure securely in place on the foundation. Thus, a need exists in the art for a tie-down that is self-compensating, that is, a tie-down that maintains secure attachment of the structure to the foundation despite shrinkage of the wood.

Two important facts and conclusions are apparent from the above statement of this important engineering and economic problem. First, a ratcheting tie-down device will ratchet to a lower position, thereby more firmly anchoring the structure, when there is sufficient shrinkage to permit ratcheting to the next thread position. That is, ratcheting occurs when the shrinkage is approximately the same as the locking distance. Therefore, decreasing locking distance in a ratcheting tie-down device leads to ratcheting with less shrinkage thereby increasing structural stability. Secondly, it would require a substantial change in structural design and construction procedures to alter the threaded rods to which tie-down devices attach, a serious barrier to adoption of different threaded rods. Therefore, it would be advantageous to achieve shorter locking distance by means of an improved TCD that requires no changes to the threaded rod(s) customarily used in the construction industry. The description of such a TCD is one objective of the present disclosure along with our co-pending application Ser. No. 12/309,574.

In fact, the importance of locking distance in maintaining structural stability is sufficiently great that the International Codes Council ("ICC") has recently promulgated standards for locking distance that must be met for a device in order to achieve Code approval. The ICC has adopted Acceptance Criteria ("AC"), AC316, that require Tension Controlled Shrinkage Compensation Devices ("TCSCD") to meet certain performance criteria. Among these is a requirement that the deflection of the TCSCD under load is limited to 0.125 inch minus "looseness." "Looseness" as used in AC316 is defined as the distance the threaded rod must be moved in the locking direction relative to the TCD before the TCD segments lock to the rod. That is, ICC "looseness" is "locking distance" as used herein while "locking direction" equates with "ratcheting direction" as used herein.

Receiving formal ICC approval for a device is an important commercial advantage in the US market. But ICC approval is based upon successfully passing independent performance tests and evaluations, providing strong evidence of the devices' capabilities, even in those jurisdictions in which formal ICC approval is not a legal requirement. Thus, a need exists in the art for a TCD meeting ICC ACs, and also demonstrating improved overall performance.

It is expected that tie-downs and shrinkage-compensation devices as used in the construction industry are likely to be an immediate and important application for the structures and devices described herein. However, the present disclosure is not so limited and provides reduced locking distances for all manner of TCDs including those employing frustoconical or flat surfaces and for any field of use in which TCDs may be employed. Thus, a need exists in the art for structures and devices for reducing locking distances in ratcheting devices.

SUMMARY OF THE INVENTION

Accordingly and advantageously, the present invention relates to improving the performance of ratcheting thread clamping devices by shortening the locking distance when the ratcheting device moves in the ratcheting direction.

It is an object of the present invention to shorten the locking distance of ratcheting thread clamping devices by employing multiple thread structures on one or more of the movable nut segments comprising the ratcheting device.

These and other features and advantages of various embodiments of the present invention will be understood upon consideration of the following detailed description of the invention and the accompanying drawings.

BRIEF DESCRIPTION OF THE DRAWINGS

To facilitate understanding, identical reference numerals have been used, where possible, to designate identical elements that are common to the figures.

The drawings herein are schematic, not necessarily to scale and the relative dimensions of various elements in the drawings are not to scale. The devices and techniques of the present invention can readily be understood by considering the following detailed description in conjunction with the accompanying drawings, in which.

DETAILED DESCRIPTION

Figure 1:
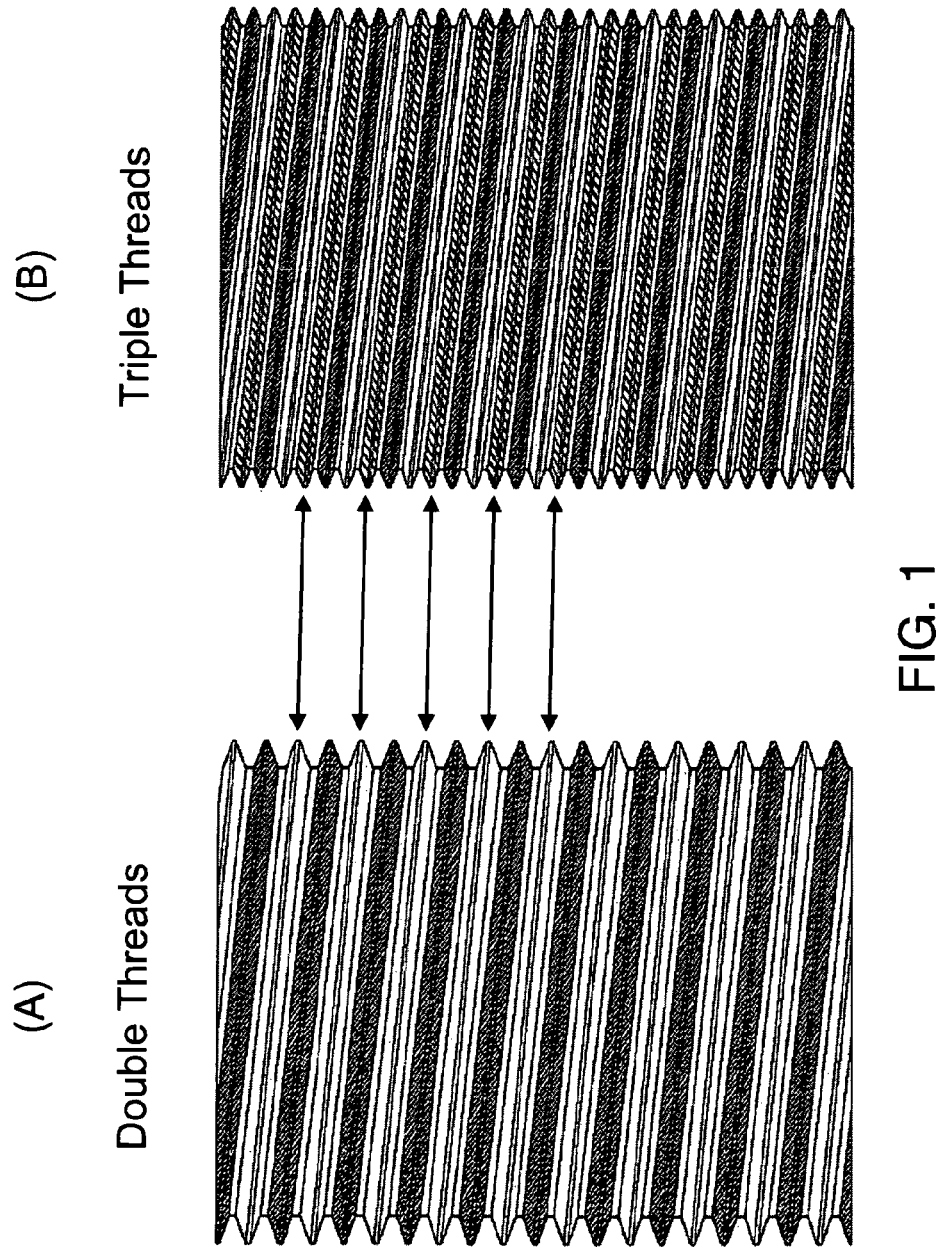
FIG. 1 is a cross-sectional depiction of a threaded rod with double threads (1A) and triple threads (1B).

After considering the following description, those skilled in the art will clearly realize that the teachings of the invention can be readily utilized to provide structures that reduce the locking distance in ratcheting thread clamping devices or fasteners when such devices are moved in the ratcheting direction along a threaded rod.

We describe herein structural changes that can be employed with virtually any ratcheting thread clamping device ("TCD") to improve (shorten) its locking distance. In summary, a ratcheting thread clamping device engages with a threaded rod and can be moved without rotating in a ratcheting direction, but requires rotation and cannot be moved any significant distance by translation in the opposite non-ratcheting direction. The locking distance indicates the distance that the TCD moves before firmly engaging to the rod. It is described herein that using double or multiple threads for at least a portion of the TCD structure leads to improved (shorter) locking distances. That is, a normally-threaded TCD has threads matching those of the rod with which it is to engage. A multiple-threaded TCD includes at least one segment having multiple interleaved threads when measured in comparison with that of the rod (and the single-threaded segment(s), if any, of the TCD). Such a structure is shown to decrease the locking distance of the TCD but still engages with a standard-threaded rod.

Previous work by the present inventor (Ser. No. 12/309, 574) described a TCD lacking frustoconical surfaces and having shortened locking distance achieved with the use of double threads. The present disclosure generalizes that work in two ways: (1) The TCD thread structure for achieving shortened locking distance is not limited to double threads but can employ multiple interleaved threads, each such thread having a pitch substantially the same as that of the threaded rod to which the TCD is to engage. (2) Shortened locking distance can be achieved with multiple threads on TCDs employing frustoconical or other geometric shapes, not limited to planar surfaces (although as described in U.S. Pat. No. 8,257,004 and Ser. No. 13/385,135, TCDs having flat surfaces offer significant improvements over TCDs using frustoconical surfaces.)

By way of illustration we describe multiple threads as they would appear as external threads on a bolt. However, this is for pedagogic purposes only since the actual multiple thread structures used herein occur as internal threads on one or more of the movable nut segments of the TCD. Applicant respectfully submits that forming a mental picture and understanding of the structure and function of multiple threads on a bolt facilitates understanding their use as internal threads on TCDs as employed herein.

Simply put, multiple threads are two or more threads having the same helix angle interleaved and spiraling around the outer circumference of a bolt, and progressing axially along the bolt in an interleaved manner similar to the interleaved spirals of stripes on a barber pole or on a holiday candy cane (but all such interleaved multiple threads on a given bolt have the same size and shape, not necessarily so for the barber pole or candy cane).

FIG. 1 depicts a side view of a bolt having double threads (1A) and triple threads (1B) indicated by different shadings for each thread but a constant shading as a particular thread spirals along the bolt. Each of the interleaved threads on the double and triple threaded bolt of FIG. 1 has the same helix angle as indicated by the matching of the white thread (double threads) with the cross-hatched threads (triple threads). Therefore, both bolts of FIG. 1 will engage with a nut having this helix angle but only a single thread. Conversely, a nut (or TCD nut segment) having multiple interleaved threads with a particular helix angle will engage with a rod having substantially the same helix angle but only a single thread.

As is apparent from FIG. 1, as an increasing number of multiple threads are interleaved on the same structure, the thickness of each thread must decrease to fit an increasing number of threads into the desired helix angle. Thus, each thread becomes weaker. There is a practical limit to the number of interleaved threads that can be employed. Thus, while the present structures for reducing locking distance in a ratcheting thread clamping device can include an arbitrary number of interleaved multiple threads, other considerations will set practical limits. It is expected that only double or occasional triple thread structures will prove advantageous in practice. To be concrete in our description, we will describe double thread structures for reducing locking distance, understanding that this is by way of illustration and not limitation. Triple or higher numbers of multiple thread structures can be employed when circumstances warrant within the scope of the present invention as would be apparent to those having ordinary skills in the art.

Figure 2:
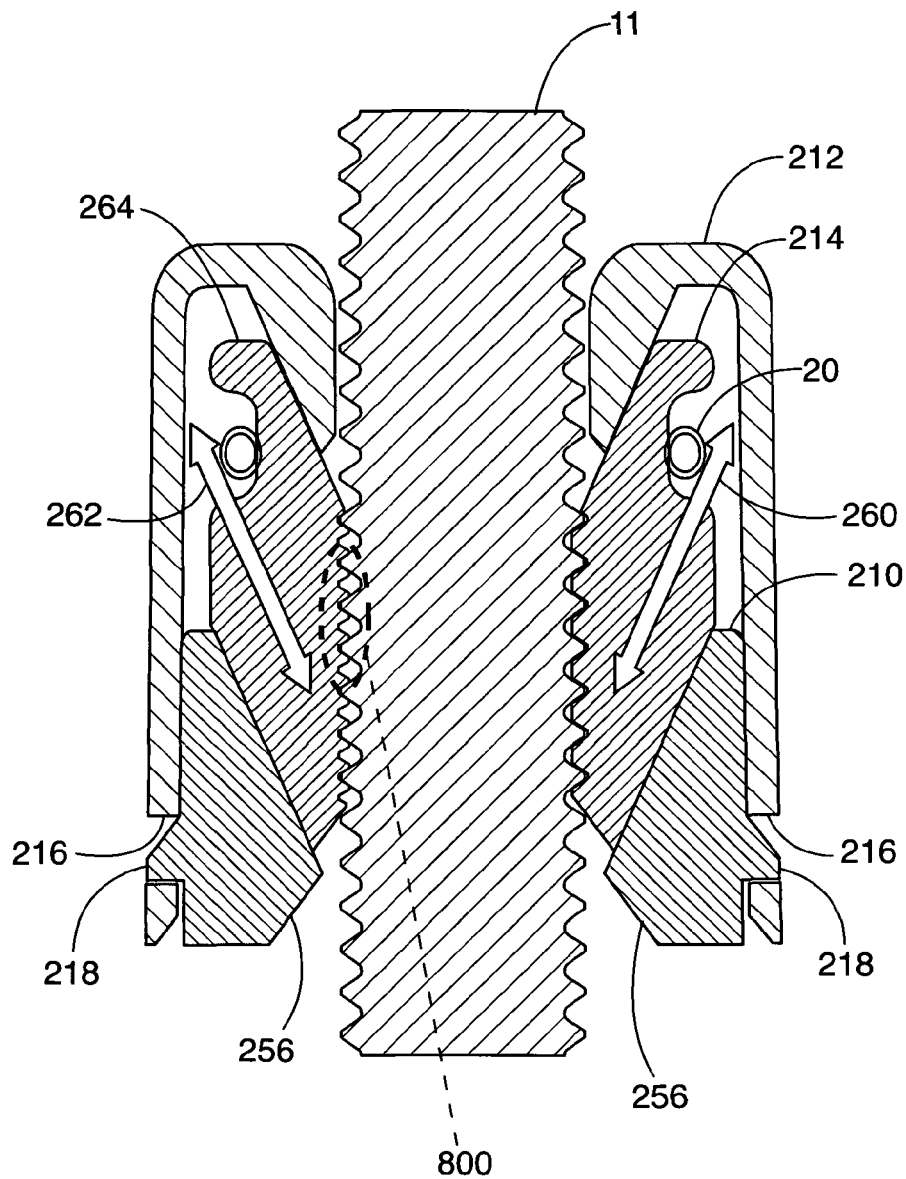
FIG. 2 is a cross-sectional depiction following Smith (U.S. patent application Ser. No. 12/309,574, FIG. 18) showing the engagement of a single-threaded rod 11 with a single-threaded nut segment 214 and a double-threaded nut segment 264.
Figure 3:
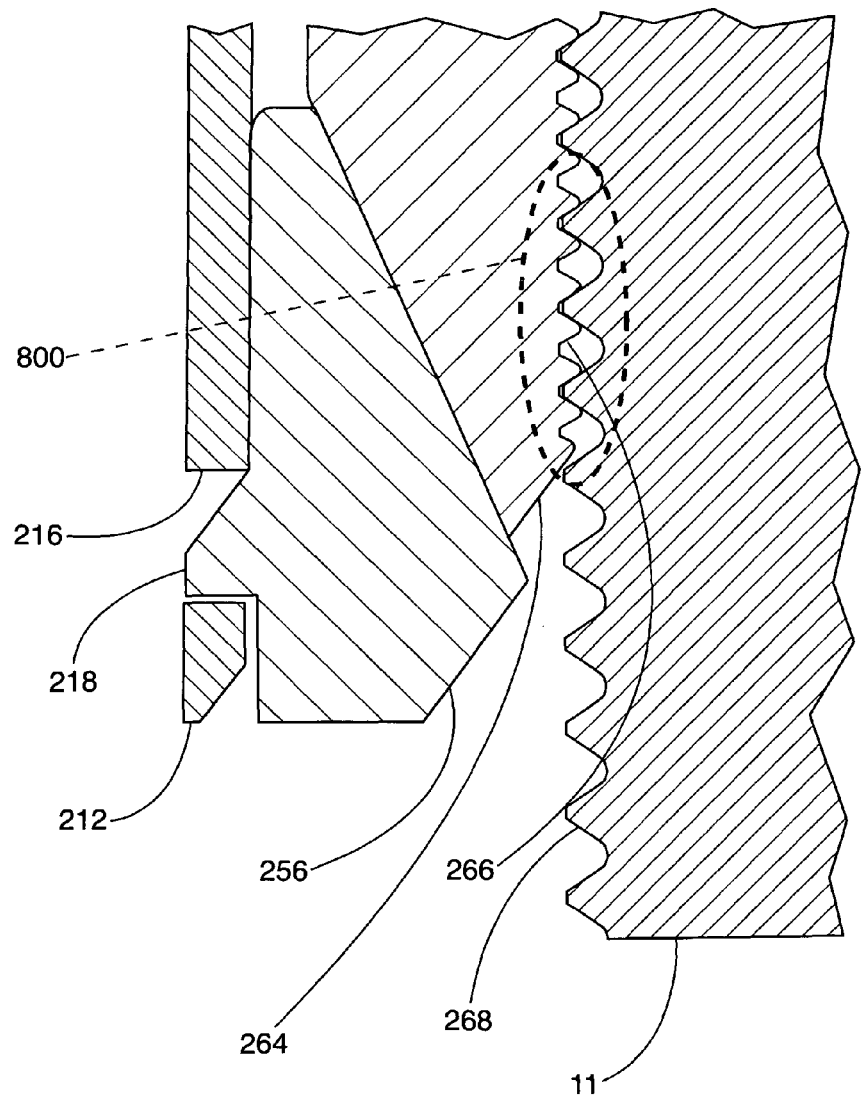
FIG. 3 is an enlarged cross-sectional depiction following Smith (U.S. patent application Ser. No. 12/309,574, FIG. 19) showing the engagement of a single-threaded rod 11 with a double-threaded nut segment 264.

The structures employed herein include multiple threads on one or more movable nut segments of a TCD device, that is internal threads. FIG. 2 depicts in cross-section double threads 800 of a TCD movable nut segment 264 engaging a single threaded rod 11 compared with a single-threaded nut segment 801 engaging rod 11 and in magnified view in FIG. 3. These figures derive from application Ser. No. 12/309,574 Patent Application Publication 2009/0324364, FIGS. 18 and 19. The other reference numbers on FIGS. 2 and 3 are discussed in the cited reference and are not relevant to the present descriptions.

In other words, double threads (or multiple threads) are two (or more) threads, each having the same helix angle but interleaved on the same structure. Consider by way of explanation for clarity the characteristics of a single-threaded conventional (non-ratcheting) solid nut vs. a double-threaded conventional (non-ratcheting) solid nut. A single-threaded nut has a single continuous thread spiraling around the nut's interior with a certain pitch or helix angle, for example, 12 threads per inch (abbreviated "nut-si-12"), and thus can engage via non-ratcheting rotation with a rod having a thread with the same helix angle, that is, a single thread of 12 threads per inch ("rod-si-12"). It is well known that threads on a nut and rod engage only if the pair of threads that engage have substantially the same helix angle.

A double-threaded nut ("nut-db") has two interleaved threads, each thread by itself forming a continuous thread and each thread having the same helix angle, for example, a helix angle for 12 threads per inch ("nut-db-12"). The nut-db-12 likewise engages with the threads of the rod-si-12, but only one of nut-db-12's two interleaved threads engages the rod. Since the threads on rod-si-12 have the same helix angle as either one of the interleaved threads on nut-db-12, only one of nut-db-12's threads engages the rod.

A casual observation might confuse such a double-threaded nut, nut-db-12, with a single-threaded nut having 24 threads per inch ("nut-si-24") since both appear to have the same density of peaks and valleys along their length, i.e. 24 per inch. But they are quite distinct. The helix angle of the nut-si-24 is quite different from the helix angle of either thread of the nut-db-12. Thus, the nut-si-24 will not engage with the rod-si-12, clearly demonstrating non-equivalence of nut-si-24 and nut-db-12.

At least one double-threaded nut segment component causes a thread ratcheting device such as the TCD to ratchet more often for a given displacement along a threaded rod than a TCD with only single-threaded components, even though the rod along which ratcheting occurs has standard single threads. Simply explained, there are two basic components to a conventional thread system, a threaded rod and a threaded nut. In a standard system both rod and nut have the same number of threads per axial inch of length (defined as "threads per inch"). Also, in standard thread systems there is only one continuous thread. One way to verify a single-threaded structure is to observe the threaded rod end-on. In a single thread system there will only be one thread start at the end of the rod. A double thread system will have two thread starts at the end of the rod with each thread start being 180 degrees opposite of the other (that is, diametrically opposite across the rod diameter). In other words, a double-threaded structure (rod or nut) has two interleaved threads making their way along the structure, and performs quite differently from a single-threaded structure having twice as many threads per inch.

A single-threaded rod will successfully engage a double-threaded nut so long as the helix angle of the (single) rod thread and (both) the nut threads are the same. The single rod thread will engage one or the other of the two (interleaved) nut threads, but not both at any one time. When a TCD having at least one double-threaded segment moves axially with respect to the single-threaded rod, the TCD will ratchet in approximately one-half the axial distance as would a TCD including only single-threaded segments. Since a double-threaded configuration has two threads in the same linear distance as the single thread in a single-threaded device, each of the double threads are one-half the size of a single thread of the same pitch and diameter. A possible disadvantage of engaging a double-threaded segment with a single-threaded rod is that there is less engagement area between the double threads and the single thread as there would be between two single threads of the same pitch and diameter, and therefore less force can be transmitted per thread. However, one may increase the total number of threads to be engaged (that is, use longer threaded segments engaging a longer distance along the rod) and therefore increase the thread engagement area to whatever is required.

Figure 4:
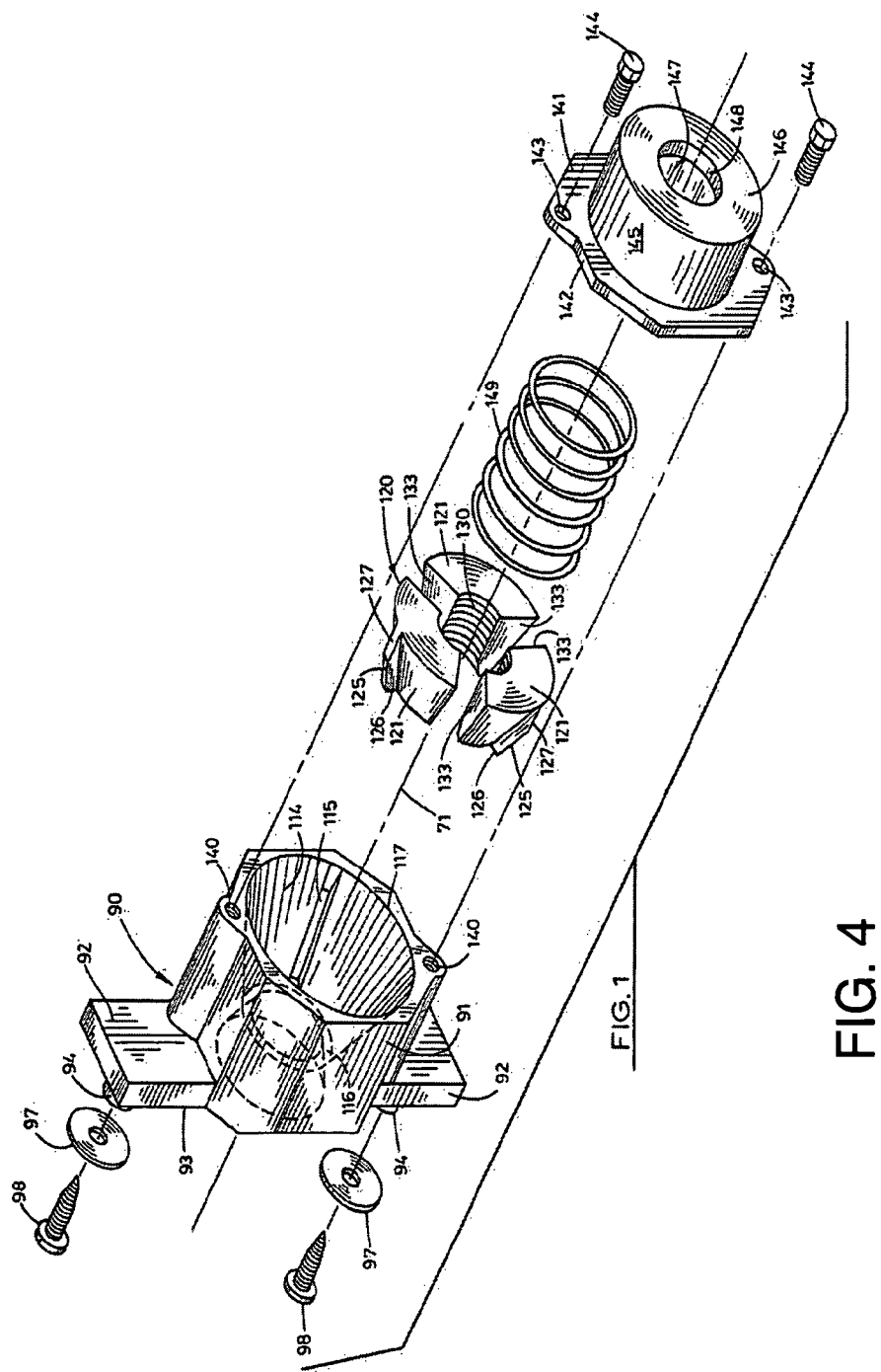
FIG. 4 is an exploded perspective view of a ratcheting thread clamping device from the prior art having frustoconical surfaces 121 engaging with the inner surfaces of the housing, 114. from Childers U.S. Pat. No. 4,974,888, FIG. 1.

FIG. 4 is an exploded of a typical prior art TCD having frustoconical surfaces on the nut segments, 120 of FIG. 4 (from Childers, U.S. Pat. No. 4,974,888 FIG. 1). Other embodiments of the present invention relate to using double (or multiple) threads on the interior of Childers' nut segments, that is 130 in FIG. 1. The use of double or multiple interleaved threads to reduce locking distance is not limited to the device of Childers. Many similar or related thread clamping devices will achieve reduced locking distances if the single threads typically employed in such devices are replaced with double or multiple threads on one or more nut segments.

Double or multiple threads have been used for many purposes in bolts, screws, nuts and the like. However, applicant respectfully submits that the prior art does not teach the use of double or multiple threads for reducing locking distance in ratcheting devices. Applicant further submits that the first teaching of this technique for reducing locking distances is the parent application to this continuation-in-part, Ser. No. 12/309,574, and that the disclosures described herein constitute an improvement and extension thereof.

Figure 5:
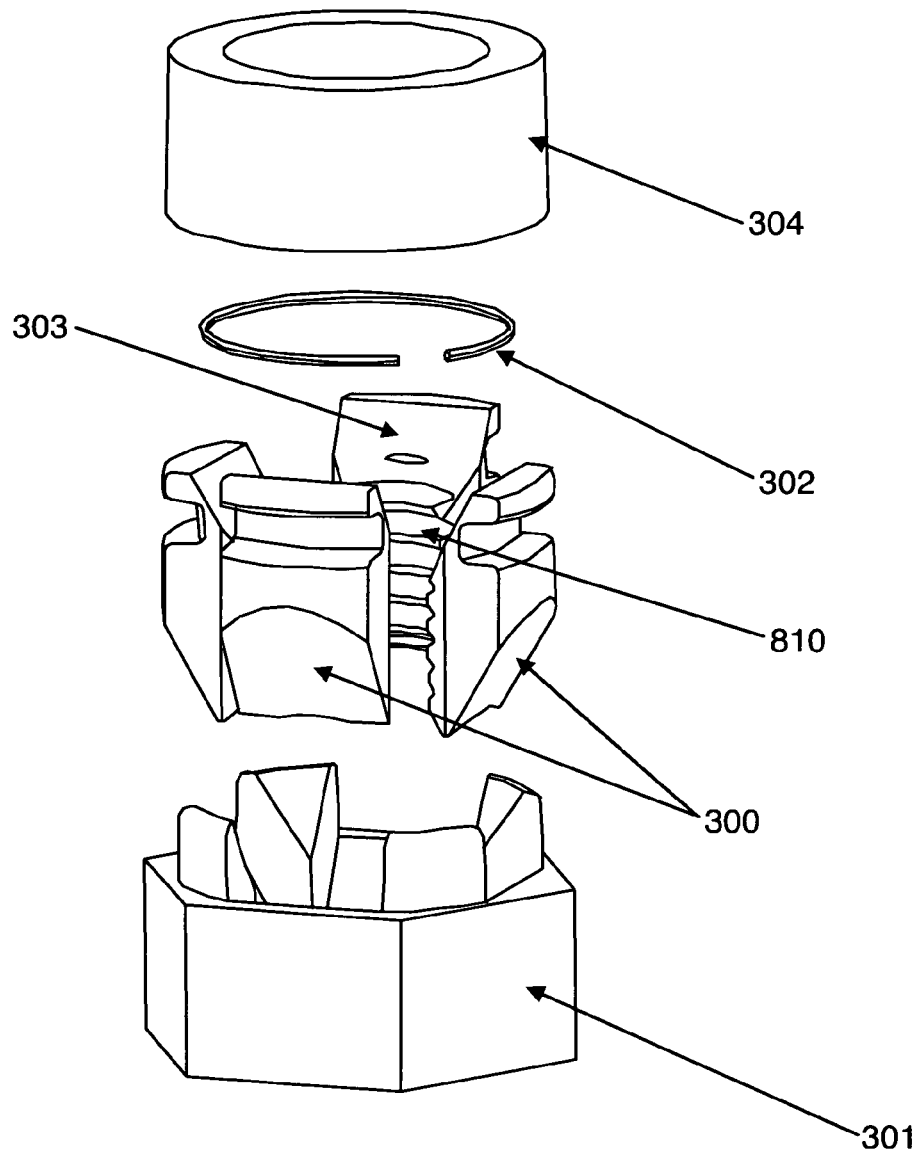
FIG. 5 is an exploded perspective view of a ratcheting thread clamping device engaging its housing with planar surfaces, 300, 303 following Smith Ser. No. 13/385,135, FIG. 60.

Embodiments of a thread clamping device TCD described in application Ser. No. 13/385,135 are also improved and achieve reduced locking distance by employing a multiple thread structure on one or more the movable nut segments thereof. FIG. 5 herein derives from FIG. 60 of Ser. No. 13/385,135 and includes a top housing 304, and an end housing 301 that surround a plurality of movable nut segments held in place with a spring or similar clamping device 302. Each nut segment has a substantially planar top segment surface 303 and outer bearing surface 300, with surfaces 303 and 300 lying in substantially parallel planes.

The threaded inner surface of one or more nut segments, 810, is suited for engaging a single-threaded rod with which the TCD engages, 11 in FIGS. 2 and 3. The TCD depicted in FIG. 5 (as described and claimed in Ser. No. 13/385,135) is a modification and improvement over the TCDs of U.S. Pat. No. 8,257,004 in that surfaces 300 engaging the end housing 301 comprise a single planar surface lacking segment ribs described in U.S. Pat. No. 8,257,004.

One advantage of the TCD depicted in FIG. 5 derives from engagement of the top and end housings with planar surfaces 303 and 300 respectively, in contrast with the frustoconical surfaces of many prior art devices (e.g. FIG. 4 herein). This permits the multiple segments surrounding the threaded rod to assume different axial positions along the threaded rod and still have intimate contact with the top and end housings. This in turn allows the use of identical segments at all circumferential positions around the threaded rod, including segments having identical thread phases. The various segments can assume different axial positions along the threaded rod such that the phases of threads in adjacent segments align to provide a continuous spiral thread around the assembly of segments. This simplifies manufacture of the segments and assembly of the TCD device since only one segment type needs to be manufactured and the order of assembly is immaterial.

As described in detail elsewhere herein, the threaded inner surface 810 of one or more nut segments may employ multiple threads in order to reduce locking distance, thereby improving the performance of the ratcheting thread clamping device depicted in FIG. 5. Therefore, using multiple threads, typically double threads, on the inner surface of one or more of the nut segments serves to reduce locking distance for the TCD of Ser. No. 13/385,135 (FIG. 5) as it does for the TCDs of Pat. No. 8,257,004.

Various other modifications and alterations in the structure and method of operation of this invention will be apparent to those skilled in the art without departing from the scope and spirit of the invention. Although the invention has been described in connection with specific embodiments, it should be understood that the invention should not be unduly limited to such specific embodiments.

What is claimed is:

1. A ratcheting thread clamping device comprising:
a plurality of movable nut segments wherein each of said movable nut segments has a threaded inner surface suited for engaging a single-threaded rod, and
wherein said threaded inner surface of at least one of said movable nut segments has a multiple thread structure, and
wherein each of the interleaved threads comprising said multiple thread structure has substantially the same helix angle as the threads of said single-threaded rod, thereby reducing the ratcheting distance of said ratcheting thread clamping device when engaged with said single-threaded rod.

2. A ratcheting thread clamping device as in claim 1 wherein said multiple thread structure comprises double threads.

3. A ratcheting thread clamping device as in claim 1 wherein said plurality of movable nut segments surround said threaded rod in a substantially frustoconical geometry.

4. A ratcheting thread clamping device comprising:
a) a top housing and an end housing surrounding a plurality of movable nut segments wherein each of said nut segments has a threaded inner surface suited for engaging a single-threaded rod; and wherein the outer bearing surface of each of said movable nut segments engages the inner surface of said end housing along at least one substantially planar surface; and
b) at least one spring flexibly directing said movable nut segments against said single-threaded rod; wherein said ratcheting thread clamping device moves axially along said threaded rod in a first direction without rotation and does not so move in a second opposite direction without rotation;
c) wherein said threaded inner surface of at least one of said movable nut segments has a multiple thread structure wherein each of the multiple interleaved threads in said multiple thread structure has substantially the same helix angle as the threads of said threaded rod; and
d) wherein said outer bearing surface of at least one of said movable nut segments engages said inner surface of said end housing along a single substantially planar surface.

5. A ratcheting thread clamping device as in claim 4 having four of said movable nut segments.

6. A ratcheting thread clamping device as in claim 4 wherein said movable nut segments have identical multiple thread structures and thread phases.

7. A ratcheting thread clamping device as in claim 4 wherein said movable nut segments have the segment top surfaces and said outer bearing surfaces lie in substantially parallel planes.

8. A ratcheting thread clamping device as in claim 4 wherein said multiple thread structure is a double thread structure.

* * * * *